(12) United States Patent
Tabanou et al.

(10) Patent No.: US 7,348,781 B2
(45) Date of Patent: Mar. 25, 2008

(54) APPARATUS FOR ELECTROMAGNETIC LOGGING OF A FORMATION

(75) Inventors: Jacques R. Tabanou, Houston, TX (US); Reza Taherian, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 213 days.

(21) Appl. No.: 11/030,670

(22) Filed: Dec. 31, 2004

(65) Prior Publication Data
US 2006/0145700 A1 Jul. 6, 2006

(51) Int. Cl.
*G01V 3/00* (2006.01)
*G01V 3/18* (2006.01)

(52) U.S. Cl. .................... 324/333; 324/332; 324/339

(58) Field of Classification Search ............ 324/323, 324/332–344; 343/824
See application file for complete search history.

(56) References Cited

U.S. PATENT DOCUMENTS

| | | |
|---|---|---|
| 3,849,721 A | 11/1974 | Calvert |
| 3,944,910 A | 3/1976 | Rau |
| 4,511,843 A * | 4/1985 | Thoraval .................... 324/338 |
| 4,689,572 A | 8/1987 | Clark |
| 4,704,581 A | 11/1987 | Clark |
| 5,243,290 A * | 9/1993 | Safinya et al. ............. 324/338 |
| 5,434,507 A | 7/1995 | Beren et al. |
| 6,297,639 B1 | 10/2001 | Clark et al. |
| 7,098,858 B2 * | 8/2006 | Bittar et al. ................ 343/719 |
| 2003/0184304 A1 * | 10/2003 | Homan et al. ............. 324/343 |
| 2003/0184488 A1 * | 10/2003 | Smith et al. ............... 343/787 |
| 2003/0229450 A1 * | 12/2003 | Strickland ................... 702/10 |
| 2006/0103389 A1 * | 5/2006 | Bespalov et al. .......... 324/338 |

\* cited by examiner

*Primary Examiner*—Reena Aurora
*Assistant Examiner*—Kenneth J Whittington
(74) *Attorney, Agent, or Firm*—Bryan L. White; Kevin P. McEnaney; Dale V. Gaudier

(57) ABSTRACT

A tool for electromagnetic logging of a formation includes a tool body configured to move in a borehole penetrating the formation; an antenna array disposed on the tool body; and an electronic unit configured to control operation of the antenna array, wherein the antenna array comprises at least one transmitter and at least one receiver, wherein at least one selected from the group consisting of the at least one transmitter and the at least one receiver comprises a printed circuit antenna.

20 Claims, 6 Drawing Sheets

APPARATUS FOR ELECTROMAGNETIC LOGGING OF A FORMATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to electromagnetic tools for well logging. More particularly, the invention relates to improved antennas and electromagnetic tools having improved antennas.

2. Background Art

The measurement of dielectric constant (or electric permittivity) of formations surrounding a borehole is known to provide very useful information about the formations. The dielectric constant of the different materials of earth formations vary widely (for example, 2.2 for oil, 7.5 limestone, and 80 for water), so measurement of dielectric properties is a useful means of formation evaluation. For example, if the lithology and the water saturation of a particular formation are known, then the porosity may be determined if the dielectric constant of the formation could be obtained. Similarly, if the lithology and porosity are known, information as to the degree of water saturation can be obtained by measuring the dielectric constant of the formation.

A logging device that improved the art of measuring formation dielectric constant was the electromagnetic propagation tool as disclosed, for example, in the U.S. Pat. No. 3,944,910 ("the '910 patent") issued to Rau and assigned to the present assignee. This patent discloses a logging device including a transmitter and spaced apart receivers mounted in a pad that is urged against the borehole wall. Microwave electromagnetic energy is transmitted into the formations, and energy which has propagated through the formations is received at the receiving antennas. The phase shift and attenuation of the energy propagating in the formations are determined from the received signals. The dielectric constant and, if desired, the conductivity of the formations can then be derived from the phase shift and attenuation measurements.

The configuration of antennas is an important aspect of successful operation of electromagnetic propagation logging tools. At a relatively high frequency of operation (for example 1100 MHz.), the signal attenuates quite rapidly. Therefore, it is important to have transmitting antennas that can efficiently generate energy and inject it into the formations, and to have receiving antennas that can efficiently receive energy that has propagated through the formations. Because the accuracy of the dielectric constant and conductivity measurements depends upon accurate measurements of attenuation and phase shift of the received signals, it is essential that the antennas operate in a stable manner over time and that the antennas are in, and remain in, a substantially balanced condition.

In the '910 patent, the antennas in the electromagnetic propagation logging device are cavity-backed slot antennas, which are filled with a dielectric material and include a probe that is an extension of the center conductor of a coaxial cable. The center conductor of the coaxial cable extends across the cavity-backed slot connects to the wall on the opposite side of the cavity-backed slot (see FIG. 2).

The probe (or conductor) of the cavity-backed antenna, as disclosed in the '910 patent, extends across the slot in a direction parallel to the longitudinal direction of the borehole. This configuration is known as a "broadside" array. U.S. Pat. No. 4,704,581 ("the '581 patent"), issued to Clark and assigned to the present assignee, discloses a similar logging device, but wherein the slot (cavity-backed) antennas have probes that extend in a direction perpendicular to the longitudinal direction of the borehole. This configuration is know as an "endfire" array. The endfire array exhibits a deeper depth of investigation and is less affected by tool standoff than the broadside array. On the other hand, the broadside array exhibits a stronger signal characteristic than the endfire array and may be preferred in relatively lossy (low resistivity) logging environment. Note that most electromagnetic logging tools have two or more receiver antennas, which facilitate the measurements of difference signals between the receiver antennas. Difference measurements cancel undesirable environmental (e.g., borehole) effects and simplify data analysis. However, one of ordinary skill in the art would appreciate that these measurements may also be performed with a single receiver antenna. In this case, the characteristics of the single antenna should be calibrated so that the true signals may be extracted from the raw measurements. With a single receiver antenna, it is more accurate to refer to the setup as a "mode" rather than an "array." However, for simplicity, this description uses "array" to generally refer to a tool configuration that includes a transmitter and one or more receivers. One of ordinary skill in the art would appreciate that embodiments of the invention are applicable to tool configurations having one or more receivers.

An example of a logging device based on the teachings of the '910 and '581 patents is a electromagnetic propagation tool sold under the trade name of EPT™ by Schlumberger Technology Corp. (Houston, Tex.). A similar tool, called adaptable EPT™ ("ADEPT"), can provide either broadside operation or endfire operation during a given run, depending on the logging conditions. The ADEPT logging tool has two changeable pads, one containing a broadside antenna array and the other an endfire antenna array.

The EPT™ or ADEPT tools use cavity-backed antennas (or slotted antennas) arrays. Other related tools based on similar arrays include U.S. Pat. No. 4,698,572 ("the '572 patent") issued to Clark. The '572 patent discloses electromagnetic logging tools incorporating slot antennas that have improved properties as compared with the conventional cavity-backed antennas. The slot antennas disclosed in this patent include tuning elements to improve the operation.

Furthermore, U.S. Pat. No. 5,434,507 ("the '507 patent") issued to Beren et al. discloses electromagnetic logging tools with two-dimensional antenna arrays. The antenna arrays may comprise conventional cavity-backed antennas or cavity-backed antennas having two conductors arranged in a crossed-dipole configuration. The two-dimensional array of antennas makes it possible to image the formations surrounding the borehole. The above described patents, i.e., the '901 patent, the '572 patent, the '581 patent, and the '507 patents, are assigned to the present assignee and are incorporated by reference in their entireties.

Although the cavity-backed antennas have been very reliable in wire line applications, the rough working environment of logging-while-drilling (LWD) applications may need a new design of antennas. If the antennas are placed on a pad, which can rotate at a rate up to 120 RPM in a drilling operation, the antennas would have much higher wear rates as compared with the wire line environment. As a result, the antennas may have to be replaced often. Accordingly, it is desirable to have new design of antennas that can tolerate the harsh environments of an LWD operation and/or can be more easily replaced.

SUMMARY OF INVENTION

One aspect of the invention relates to antennas for electromagnetic logging tools. An antenna in accordance with embodiments of the invention are RF antennas that may be manufactured using printed circuit technologies.

Another aspect of the invention relates to tools for electromagnetic logging of a formation. A tool in accordance with one embodiment of the invention includes a tool body configured to move in a borehole penetrating the formation; an antenna array disposed on the tool body; and an electronic unit configured to control operation of the antenna array, wherein the antenna array comprises at least one transmitter and at least one receiver, wherein at least one selected from the group consisting of the at least one transmitter and the at least one receiver comprises a printed circuit antenna.

Another aspect of the invention relates to methods for logging a well. A method in accordance with one embodiment of the invention includes moving an electromagnetic logging tool in a borehole penetrating a formation; transmitting an electromagnetic energy from at least one transmitter disposed on the electromagnetic logging tool into the formation; and receiving a signal from the formation using at least one receiver disposed on the electromagnetic logging tool, wherein at least one selected from the group consisting of the at least one transmitter and the at least one receiver comprises a printed circuit antenna.

Another aspect of the invention relates to methods for manufacturing an electromagnetic logging tool. A method in accordance with one embodiment of the invention includes disposing at least one transmitter and at least one receiver on a tool body that is configured to move in a borehole penetrating a formation; and disposing an electronic unit in the tool body, wherein the electronic unit is configured to control operation of the at least one transmitter and the at least one receiver, and wherein at least one selected from the group consisting of the at least one transmitter and the at least one receiver comprises a printed circuit antenna.

Other aspects and advantages of the invention will be apparent from the following description and the appended claims.

DETAILED DESCRIPTION

Embodiments of the invention relate to RF antennas for logging operations and tools incorporating the same. An antenna in accordance with embodiments of the invention have properties similar to those of a cavity-backed antenna. However, an antenna of the invention does not need to have a box to provide the cavity. Some antennas of the invention may be manufactured using printed circuit technologies. Such antennas can better tolerate stresses that are expected in downhole environments, especially the harsh environments encountered in logging-while-drilling operations.

Figure 1:
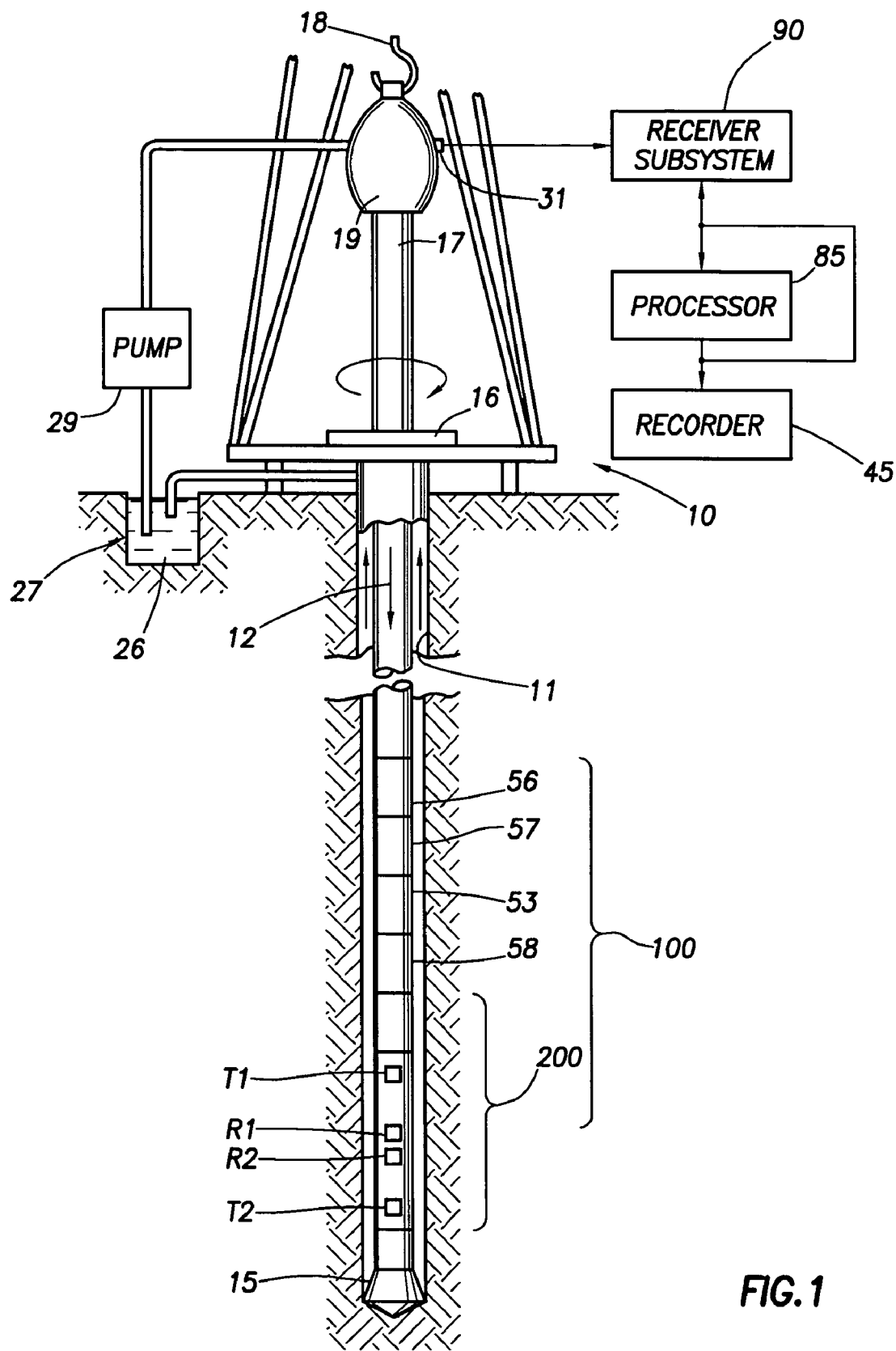
FIG. 1 shows a conventional logging-while-drill system.

FIG. 1 shows a logging-while-drilling (LWD) apparatus and telemetry system. As shown, a platform and derrick 10 are positioned over a borehole 11. A drill string 12 includes a drill bit 15 at its lower end. The drill string 12 and the drill 15 are rotated by a rotating table 16, which engages a kelly 17 at the upper end of the drill string 12. The drill string 12 is suspended from a hook 18. The kelly 17 is connected to the hook 18 through a rotary swivel 19, which permits rotation of the drill string 12 relative to the hook 18.

Drilling fluid or mud 26 is contained in a pit 27. A pump 29 pumps the drilling fluid into the drill string 12 via a port in the swivel 19 to flow downward through the center of drill string 12. The drilling fluid exits the drill string 12 via ports in the drill bit 15 and then circulates upward in the region between the outside of the drill string and the periphery of the borehole. As is well known, the drilling fluid thereby carries formation cuttings to the surface of the earth, and the drilling fluid is returned to the pit 27 for recirculation.

Mounted within the drill string 12, preferably near the drill bit 15, is a downhole sensing, processing, storing and transmitting subsystem 100. A transmitting subsystem may include an acoustic transmitter 56, which generates an acoustic signal in the drilling fluid. The generated acoustic mud wave travels upward and is received at the surface of the earth by transducers 31, which convert the received acoustic signals to electronic signals. The output of the transducers 31 is coupled to the uphole receiving subsystem 90, which demodulates the transmitted signals and relays the demodulated signals to processor 85 and recorder 45.

Transmitter 56 is controlled by transmitter control and driving electronics 57 which includes analog-to-digital (A/D) circuitry that converts the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

The downhole subsystem 100 may further include acquisition and processor electronics 58, which include a microprocessor (with associated memory, clock circuitry, and interface circuitry) and processing circuitry. The acquisition and processor electronics 58 are coupled to the measuring apparatus 200. The acquisition and processor electronics 58 is capable of storing data from the measuring apparatus 200, processing the data and storing the results, and coupling any desired portion of the information it contains to the transmitter control and driving electronics 57 for transmission to the surface by transmitter 56. A battery 53 may provide downhole power. Alternatively, a downhole generator (not shown) such as a "mud turbine" may be utilized to provide power during drilling.

Subsystem 100 includes a measuring apparatus 200. In accordance with one embodiment of the invention, the measuring apparatus 200 may include an EPT™-like device having one or more antenna arrays, each comprising, for example, four antennas $T_1$, $T_2$, $R_1$, and $R_2$. The T1-R1-R2-T2 configuration, shown in FIG. 1, can provide borehole-compensated measurements, as disclosed in U.S. Pat. No. 3,849,721 issued to Calvert. However, one of ordinary skill in the art would appreciate that embodiments of the invention are not limited to this configuration. Instead, embodiments of the invention may include one or more transmitters and one or more receivers. In accordance with embodiments of the invention, the antennas of an electromagnetic logging tool may provide similar advantages as the conventional cavity-backed antennas. However, antennas of the invention do not have physical box-like structures (a box or a slot on the tool body) or conductive wire connections to the walls of the box-like structures.

Figure 2:
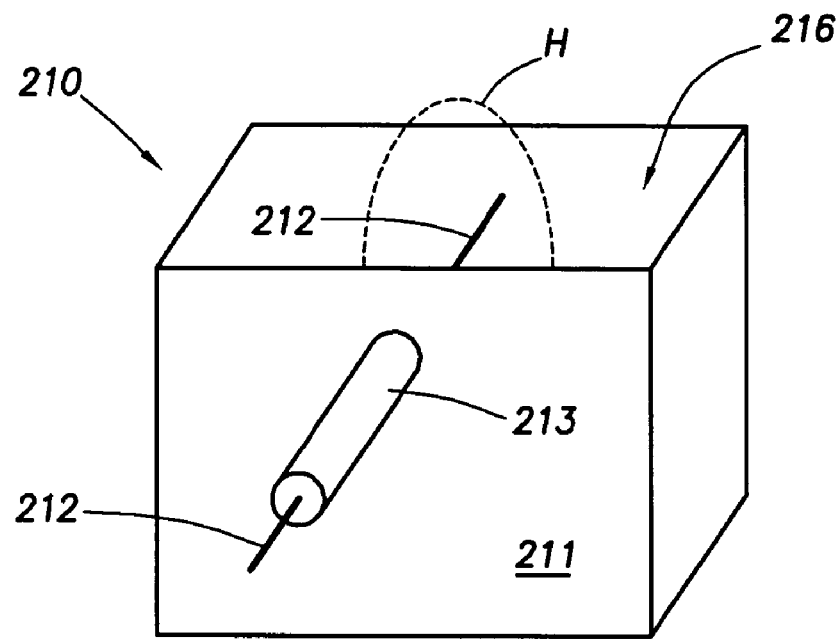
FIG. 2 shows a prior art cavity-backed antenna.

FIG. 2 shows a prior art cavity back antenna. As shown, the cavity back antenna 210 includes a metallic box 211 having one side open to form a cavity 216. The cavity 216 is a metallic cavity, where electromagnetic standing waves can be generated and emitted through the open face on the top of the box 211. The electromagnetic radiation is delivered to the cavity by a coaxial cable having a center conductor 212 and an outer conductor 213. The outer conductor 213 of the coax is shorted to the wall of the box 211 at the entrance. The center conductor 212 extends to the opposite wall of the box 211 and is connected to this wall.

Electrically, the current in the center conductor 212 returns along the walls of the box 211 to reach the outer conductor 213 of the coax. As a result, the current paths comprise a series of current loops around the center conductor 212 and the walls of the box 211. The center conductor 212 acts as the common conductor for all current loops. Simple right hand rule can be used to show that the magnetic field generated from these loops is shown as H in FIG. 2. Such magnetic field H distribution is equivalent to a horizontal magnetic dipole. In fact, horizontal magnetic dipoles are typically used to model the behavior of this type of antennas.

The box 211 of a conventional cavity-backed antenna is tough enough to withstand certain degree of stress. However, the center conductor 212 of the coax cable and its connection to the cavity walls are potential weak points in the mechanical design of the antenna. In a drilling operation, axial forces as well as shear forces would be continuously applied to the cavity. The coax cable and the connections may break under stress. Therefore, it is desirable to have a more reliable design of antennas.

Figure 3:
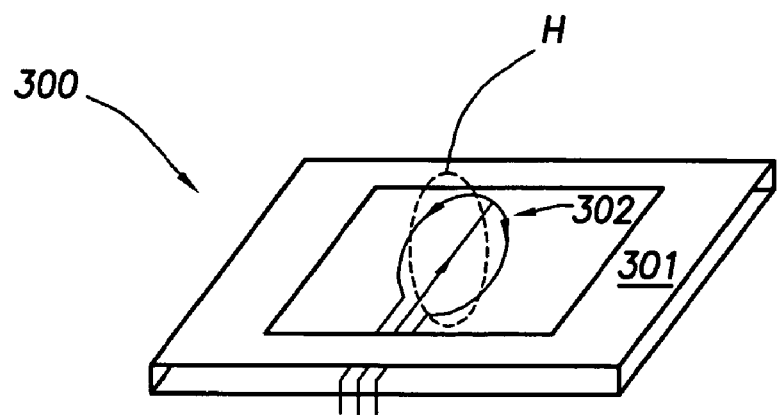
FIG. 3 shows an RF antenna in accordance with one embodiment of the invention.

Embodiments of the invention can achieve the same antenna behavior as the cavity-backed dipole antenna shown in FIG. 2, without the need for a box. FIG. 3 shows an antenna in accordance with one embodiment of the invention that can be mounted on a printed circuit or manufactured as a printed circuit. As shown, a loop antenna 300 is formed on an insulating layer 301. The antenna 300 may be a printed circuit or part of a printed circuit. The magnetic field H generated by such an antenna is similar to that generated by a prior art cavity backed antenna shown in FIG. 2. The material of the insulating layer 301 can be, for example, ceramic, polyimide, thermoplastic resin, thermoset resins, plastics, etc, on which the antenna loop 302 is engraved, etched, or printed. Such antenna allows for some bending under compression. Therefore, such an antenna is less prone to break under stress.

Figure 4:
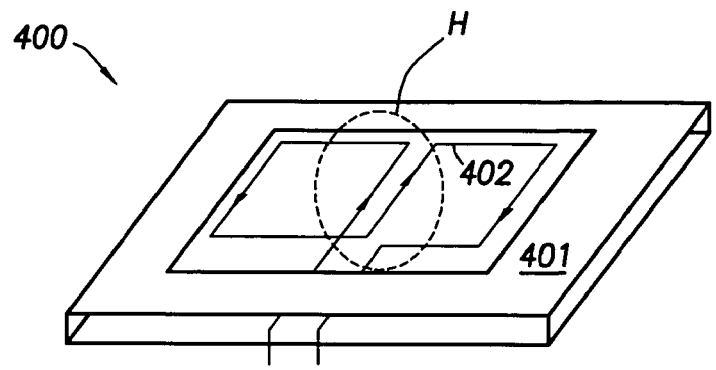
FIG. 4 shows an RF antenna in accordance with another embodiment of the invention.

FIG. 4 shows another antenna in accordance with one embodiment of the invention. In this variation, two loops are formed to produce a similar magnetic field as that shown in FIG. 3. As shown in FIG. 4, a printed circuit 402 forms two loops on an insulating material 401. In principle, the loops formed by circuit 402 shown in FIG. 4 are reminiscent of the current paths of the cavity backed antenna of FIG. 2. The design in FIG. 4 is slightly more complicated than that in FIG. 3 and requires a multi-level printed circuit. However, the approach shown in FIG. 4 can potentially be used to make multi-turn antennas. It is well known that, for the same circulating current, the efficiency of a loop antenna is proportional to the loop area and the number of turns. Therefore, the approach sown in FIG. 4 can potentially be used to produce more efficient antennas.

Figure 5:
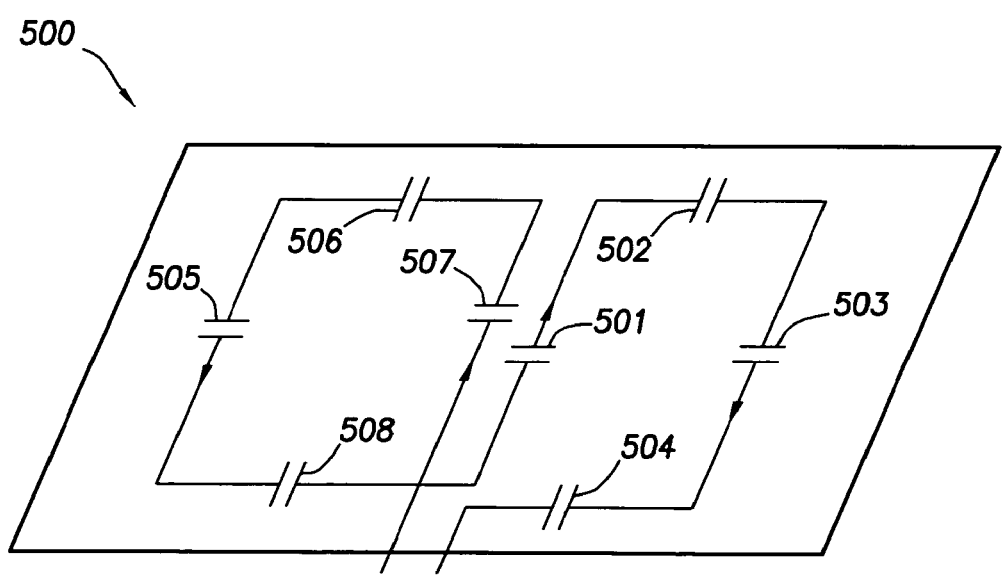
FIG. 5 shows an RF antenna having capacitors in accordance with one embodiment of the invention.

The printed circuit designs as shown in FIG. 3 and FIG. 4 are easier to manufacture than the conventional cavity-backed antennas and can avoid the potential weak points at the junctions of the cavity backed antenna shown in FIG. 2. In addition, the printed circuit antennas can be readily tuned. Because loop antennas are inductors by nature, it is common to use capacitors to tune these antennas. However, one of ordinary skill in the art would appreciate that tuning elements other than capacitors may also be used without departing from the scope of the invention. The capacitors are usually placed outside the cavity in a prior art cavity antenna. With the printed circuit approach, the capacitors may be created as well-defined discontinuities in the current paths, as shown in FIG. 5. For example, one or more capacitors (e.g., capacitors 501, 502, 503, and 504 in FIG. 5) may be placed at multiple locations around the current loop. Similar capacitors (e.g., capacitors 505, 506, 507, 508) may be included on the other half of the antenna loop, as shown in FIG. 5. This distributed capacitors approach has certain advantages. For example, these capacitors may function to reduce eddy currents. As a result, such antennas would be less sensitive to the outside environment.

FIG. 5 uses "in-line" capacitors as tuning elements, in which the capacitors are integral parts of the circuit loop. It should be understood that other types of capacitors may be used, such as a conventional capacitor, a lumped capacitor, a shunt stub or other suitable tuning elements. Such elements may be disposed or printed between the printed loop and the power supply. In addition, non-capacitor based tuning elements, such as inductive tuning elements, may also be employed to tune the parasitic capacitance of the circuit.

Figure 6:
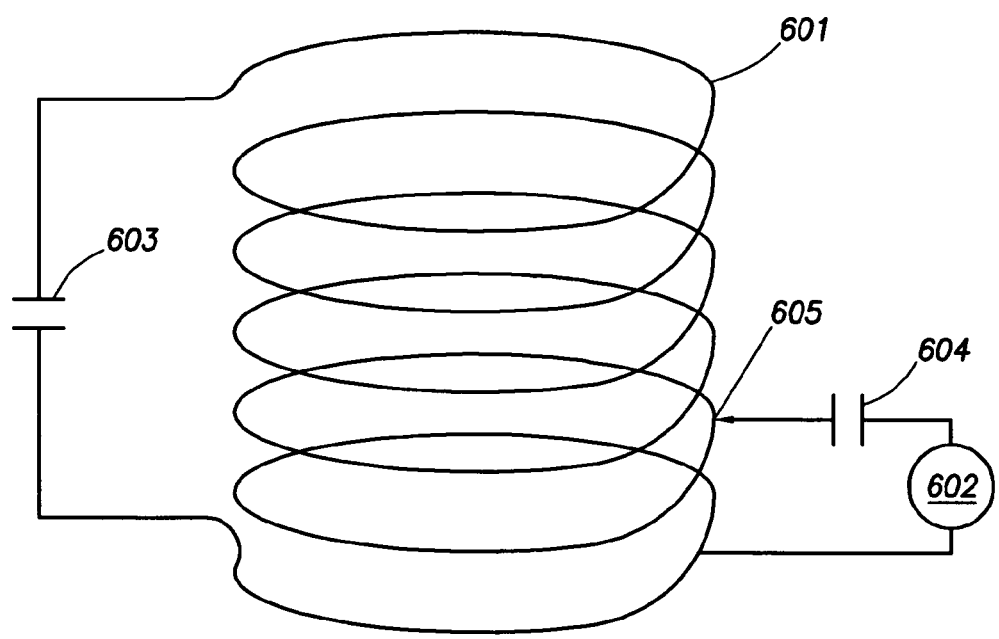
FIG. 6 shows an RF antenna in accordance with another embodiment of the invention, wherein the antenna includes multiple turns.

As noted above, the multi-layer printed circuit antennas can provide stronger magnetic moments because the magnitudes of magnetic moments are directly proportional to the number of turns of a coil. In addition, a multi-turn antenna loop can be energized, as shown in FIG. 6, by connecting to an RF source 602 at a location on the antenna such as point 605, to provide an improved impedance matching between the RF source 602 and the antenna load. Furthermore, the antenna 601 may include a capacitor 603 for tuning the load (i.e., load balancing). The capacitor 603 may be a tuning capacitor similar to those described with reference to FIG. 5. In addition, a capacitor 604 may be included as part of the impedance matching network to provide AC coupling.

Figure 7:
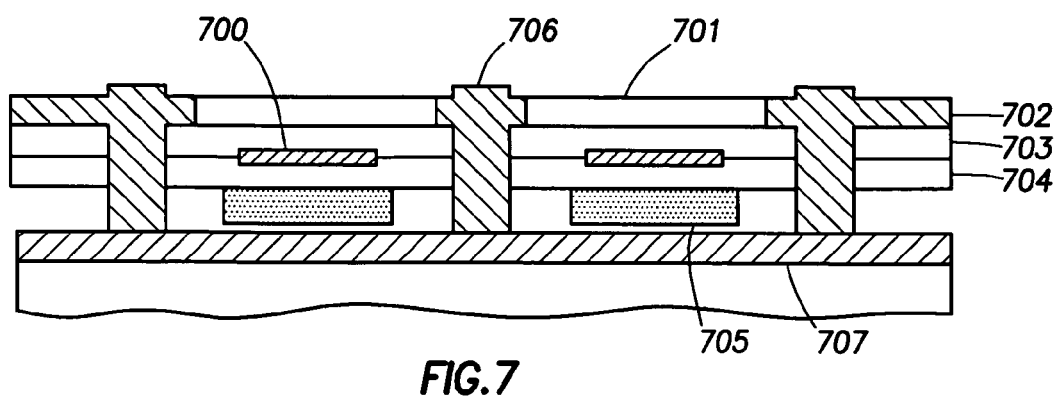
FIG. 7 shows a cross-sectional view of an array in accordance with one embodiment of the invention.

The printed circuit type antennas, in accordance with embodiments of the invention, may be assembled to form an antenna array. FIG. 7 shows a cross-sectional view of one example of an antenna array comprising two antennas 700. In FIG. 7, two antennas are assembled between two insulating layers 703 and 704 to form the antenna array. The metallic cover 702 may be mounted over the base 707 to form individual cavities, which prevent direct interaction between the antennas. In some embodiments, the cover 702 may be a layer disposed on top of the insulating layer 703, while the separation between the antennas are achieved using other structures (not shown).

The cover 702 has windows 701 cut in it to allow the radiation to be transmitted into the formation or to allow signals to reach the antenna (receiver). One of ordinary skill in the art would appreciate that the openings on the metal cover 702 may be configured in certain patterns to allow magnetic moments in particular directions to pass through. See e.g., U.S. Pat. No. 6,297,639 issued to Clark et al. These windows 701 may be covered with an insulating material to prevent the borehole fluid from entering the cavity. Parts of cover 706, may be allowed to protrude outside to provide additional protection against wear.

Electronic components (or electronic units) such as 705 may be mounted underneath the insulating layer 704. In some embodiments, the electronic components 705 may be disposed outside the printed circuit antenna array module. The electronic components 705 may function to control the operations of the antenna 700 (e.g., the transmitters and the receivers). Detailed designs and functions of the electronic units for controlling the operations of the transmitters and receivers are generally known in the art. See e.g., U.S. Pat. No. 3,849,721 issued to Calvert and U.S. Pat. No. 4,689,572 issued to Clark. These patents are assigned to the present assignee and are incorporated by reference in their entirety.

Figure 8A:
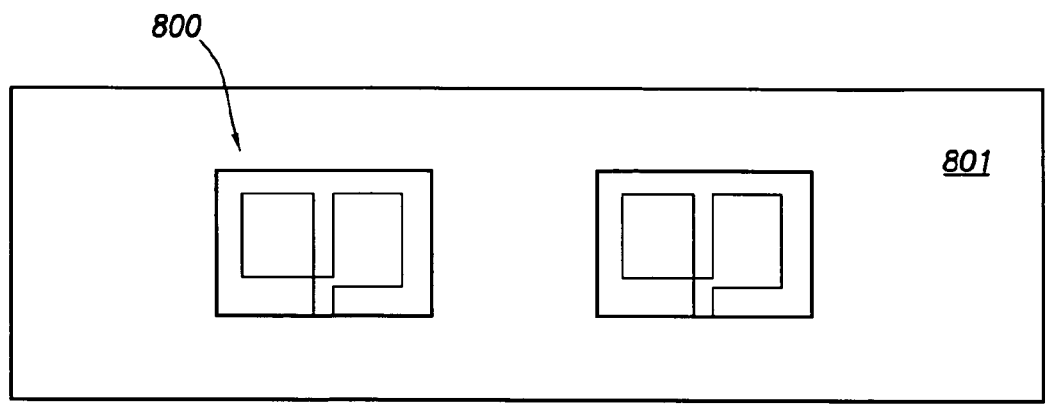
FIG. 8A shows an endfire array and FIG. 8B shows a broadside array, in accordance with one embodiment of the invention.
Figure 8B:
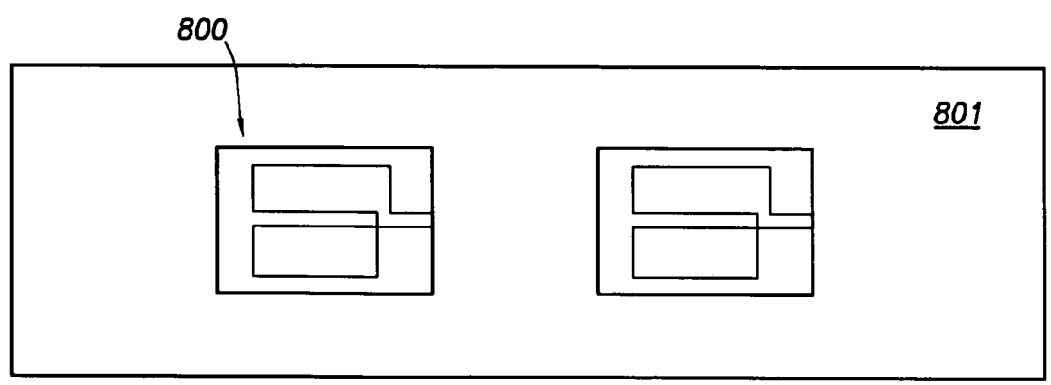

FIGS. 8A and 8B show the top views of two antenna arrays, a cross-sectional view of which is shown in FIG. 7. Here, two different types of arrays are shown, namely endfire (FIG. 8A) and broadside (FIG. 8B) arrangements of the antennas. For description of broadside arrays see the '910 patent. For a description of endfile arrays see the '581 patent. In each of these arrays, two antennas are shown to have the same magnetic moments orientation. Such antenna arrays are commonly used as the receivers in borehole-compensated electromagnetic measurement tools as disclosed in U.S. Pat. No. 3,849,721. Alternatively, in non-borehole compensated tools, one of the antennas in the array may function as a transmitter, while the other may function as a receiver. Thus, FIGS. 8A and 8B may be examples of single-receiver tool designs.

The two examples shown in FIGS. 8A and 8B are for illustration only. One of ordinary skill in the art would appreciate that many variations of these arrays are possible without departing from the scope of the invention. For example, an array may include more than two antennas. For example, a typical borehole-compensated array will include four antennas (two transmitters and two receivers) in the T1-R1-R2-T2 configuration, as shown in FIG. 9.

Figure 9:
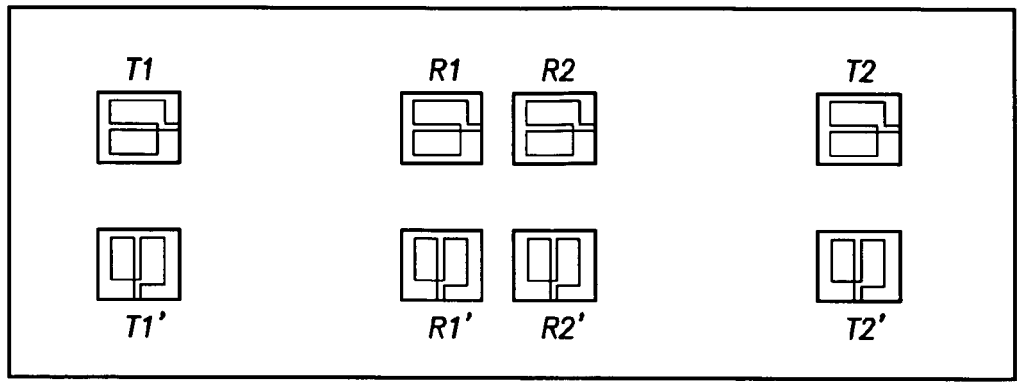
FIG. 9 shows a tool configuration including an endfire array and a broadside array in accordance with one embodiment of the invention.

FIG. 9 further shows that two or more antenna arrays may be organized in a two-dimensional array as disclosed in U.S. Pat. No. 5,434,507 issued to Beren et al. As shown in FIG. 9, a second antenna array, comprising T'-R1'-R2'-T2', is arranged in a different configuration (endfire) from that of the first antenna array (broadside).

While FIG. 9 shows that the two antenna arrays are disposed on the same pad, one of ordinary skill in the art would appreciate that they can also be disposed on separate pads without departing from the scope of the invention. Furthermore, each of the transmitter and the receiver antennas within the same array may be an endfire or broadside magnetic dipole antenna. Thus, some of the arrays may include cross dipoles, i.e., the transmitter and receivers are not of the same polarization (i.e., magnetic dipole orientation).

Figure 10:
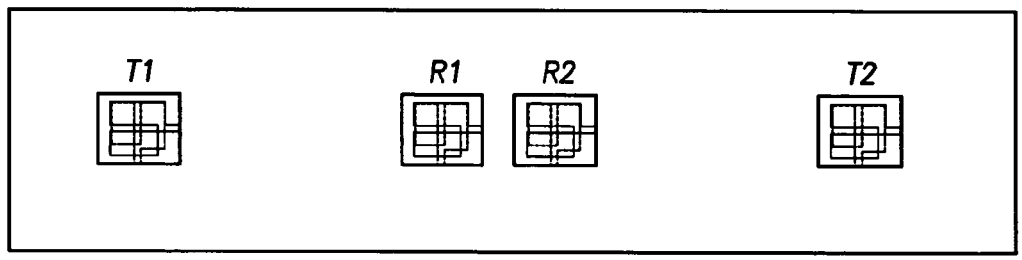
FIG. 10 shows another tool configuration having both endfire and broadside antennas at the same location.

In addition, the endfire array (T1-R1-R2-T2) and the broadside array (T'-R1'-R2'-T2') shown in FIG. 9 may be constructed at the same location by using multi-layer printed circuits. FIG. 10 shows one such embodiment. As shown in FIG. 10, each of the four antennas T1, T2, R1, and R2 includes two circuits arranged to produce an endfire and a broadside magnetic dipoles at the same location. Each of these antennas is reminiscent of the antennas disclosed in U.S. Pat. No. 5,434,507 issued to Beren et al. (see FIG. 2 and FIG. 3 in the Beren et al. patent). Note that each of the endfire and broadside antennas shown in FIG. 10 may be independently used to produce cross-dipole and/or non-cross-dipole measurements. Note that while four antennas are shown in this example, one of ordinary skill in the art would appreciate that any combination of transmitter and receiver antennas may be used without departing from the scope of the invention. For Example, a tool in accordance with one embodiment of the invention may have the following array: R1-R2-R3-T1-T2-R4-R5-R6.

The above description shows that embodiments of the invention may be used in a logging tool that is like an EPT™ or ADEPT. Embodiments of the invention may be used with wireline or logging-while-drilling (LWD), Measurement-while-drill (MWD), or logging-while-tripping (LWT) tool. A tool including antennas of the invention may be operated at appropriate frequencies to achieve different types measurements, i.e., induction and propagation measurements. Therefore, a tool in accordance with the invention may be used in all kind of mud (water-based or oil-based muds). In a particular embodiment, a tool of the invention can provide borehole images in a well drilled with all types of muds, i.e., an all mud imager.

When used on an LWD or MWD tool, an antenna array of the invention may be disposed in an articulating pad. Such articulating pads are known in the art, for example, the articulating pads on the PowerDrive™ tool available from Schlumberger Technology Corp. (Houston, Tex.). Alternatively, these arrays may be disposed on drill collars, pads extended from drill collars, or stabilizers of the LWD or MWD tools.

Advantages of the invention may include one or more of the following. An RF loop antenna in accordance with embodiments of the invention may be used with various downhole tools, such as an all mud imager. An antenna in accordance with embodiment of the invention may be made more reliable than the prior art cavity backed antennas because an antenna of the invention may be able to tolerate more bending stresses. An antenna in accordance with embodiment of the invention can be made to radiate more RF power into the rock formation by using multi turns instead of a single turn. An antenna in accordance with embodiment of the invention can be tuned easier and more efficiently by designing the capacitors as an integral part of the loop and taking advantage of distributed capacitor approach. An antenna of the invention may be efficiently operated at relatively high frequency (e.g., 1 GHz or higher) for dielectric constant logging. An antenna in accordance with embodiment of the invention is easier to build because it is compatible with printed circuit technology and a tool based on such antennas is cheaper to manufacture and maintain because of the modular construction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tool for electromagnetic logging of a formation, comprising:
   a tool body configured to move in a borehole penetrating the formation;
   one or more antennas disposed on the tool body; and
   an electronic unit configured to control operation of the one or more antennas;
   wherein at least one of the one or more antennas comprises a cavity formed through a stack of layers and a loop formed on a printed circuit, the loop being disposed within the cavity.

2. The tool of claim 1, wherein the one or more antennas is disposed on an articulating pad of the tool body.

3. The tool of claim 1, wherein the tool is a logging-while-drilling tool, a measurement-while-drilling tool, or a logging-while-tripping tool and wherein the loop is formed on a bendable insulating material layer.

4. The tool of claim 1, wherein the at least one of the one or more antennas comprises a tuning element.

5. The tool of claim 4, wherein the tuning element comprises at least one capacitor.

6. The tool of claim 5, wherein the at least one capacitor is an integral part of a printed circuit.

7. The tool of claim 5, wherein the at least one capacitor comprises a plurality of capacitors distributed at a plurality of locations in a printed circuit.

8. The tool of claim 1, wherein the one or more antennas comprises a broadside array.

9. The tool of claim 1, wherein the one or more antennas comprises an endfire array.

10. The tool of claim 1, wherein the one or more antennas comprises a cross-dipole array.

11. The tool of claim 1, wherein the one or more antennas comprise a multi-layer printed circuit antenna having a multi-turn loop.

12. The tool of claim 1, wherein the one or more antennas are impedance matched with a radio frequency source.

13. A method for logging a well, comprising:
   carrying one or more antennas on an electromagnetic logging tool and an electronic unit configured to control operation of the one or more antennas;
   moving the electromagnetic logging tool in a borehole penetrating the formation;
   transmitting an electromagnetic energy from at least one of the one or more antennas; and
   receiving a signal using at least one of the one or more antennas,
   wherein at least one of the one or more antennas comprises a cavity formed through a stack of layers and a loop formed on a printed circuit, the loop being disposed within the cavity.

14. The method of claim 13, wherein the electromagnetic energy has a relatively high frequency.

15. The method of claim 13, wherein the at least one of the one or more antennas is disposed on an articulating pad on the electromagnetic tool.

16. A method for manufacturing an electromagnetic logging tool, comprising:
   forming an antenna by: stacking layers to form a cavity through a stack of the layers, forming a loop on a printed circuit, and disposing the loop within the cavity;
   disposing the antenna on a tool body that is configured to move in a borehole penetrating the formation; and
   disposing an electronic unit in the tool body.

17. The method of claim 16, wherein the antenna is disposed on an articulating pad on the tool body.

18. The method of claim 16, wherein the forming an antenna includes forming a plurality of antennas and disposing the antennas includes arranging the antennas in a broadside array.

19. The method of claim 16, wherein the forming an antenna includes forming a plurality of antennas and disposing the antennas includes arranging the antennas in an endfire array.

20. The method of claim 16, wherein the antenna is a cross-dipole antenna.

* * * * *